July 6, 1937.  J. J. O'BRIEN  2,085,826

INDICIA OF INVESTMENTS

Filed Aug. 6, 1934

Inventor
James J. O'Brien.
by Charles T. Wills Attys.

Patented July 6, 1937

2,085,826

UNITED STATES PATENT OFFICE 2,085,826

INDICIA OF INVESTMENTS

James J. O'Brien, Chicago, Ill.

Application August 6, 1934, Serial No. 738,627

3 Claims. (Cl. 282—26)

This invention relates to improvements in indicia of investments, and more particularly to indicia of a character highly desirable for use in connection with stocks, bonds and securities purchases and sales, and which could also be readily used in restaurants, check rooms, repair shops, and similar places of business wherein a ticket, check or coupon is given to the purchaser as evidence of his purchase and expenditure or an article left on deposit, and the invention may have many other uses and purposes as will be apparent to one skilled in the art.

In the past, many and various tickets, coupons, checks and the like have been used as evidencing an investment or expenditure which may or may not have been of a somewhat speculative nature, but these coupons and the like were objectionable in that an accurate record could not be kept with any degree of satisfaction. For example, if a purchaser bought a few shares of stock, paid his money, and received a ticket evidencing the investment, it was incumbent upon the clerk to write the amount and nature of the investment upon the ticket, and then make a similar entry in a record book entirely separate and apart from the ticket. Such practice was very conducive to mistakes, as well as falsifying of the coupon or ticket on the part of the purchaser or falsifying of the record on the part of the clerk. Furthermore, no accurate and quickly visible control sheet of all the transactions pertaining to a certain series of coupons or tickets was available, and it was almost impossible, except by very laborious checking systems, to ascertain the exact nature, expenditure and amount relative to each transaction, to say nothing of all the transactions handled during the day by the one clerk. Obviously, previous checking systems of this character were objectionably expensive, due to the multitudinous operations necessary and the number of books, etc., for the proper obtaining and keeping of records.

With the foregoing in mind, it is an object of this invention to provide apparatus for use in connection with various expenditures and investments wherein a ticket, coupon, check or the like may be delivered to each purchaser as evidence of not only the amount but the character of his purchase, and simultaneously with the marking of the said ticket, an indelible record is made for the firm or establishment.

It is also an object of this invention to provide investment indicia wherein an indelible record is automatically kept with the furnishing of a coupon evidencing an expenditure, and a record is kept upon a single sheet indicating not only the amount of expenditure but the character of the investment for a certain series of coupons, whereby a complete accounting record is already had when the said series of coupons have been delivered.

Still another object of this invention is the provision of indicia of investments wherein upon a single sheet, which may be of any suitable size or nature for subsequent securing in a record book, a record of the nature and amount of expenditure for a plurality of transactions consistent with a certain series of coupons is automatically made as each transaction is recorded on each coupon.

It is also an object of this invention to provide a pad or tablet made up of successive layers, one layer being a record sheet, and the next adjacent layer being a plurality of overlapped tickets, coupons, or the like, with the exposed portion of each ticket overlying the corresponding space on the record sheet, whereby with a carbon paper between the layer of tickets and the record sheet, every entry made upon a ticket is automatically recorded upon the record sheet.

Still a further object of this invention is the provision of an apparatus including a record sheet over which is disposed a plurality of overlapping coupons, the coupons each being identified and provided with marked spaces for indicating the character and amount of an expenditure or investment, the sheet being similarly marked relatively to the exposed portion of each coupon, whereby after all the coupons are utilized in the course of business, the different columns upon the sheet may be totaled, the amount of return upon each coupon entered in the proper place upon the sheet, these amounts totaled, and a complete record of that series of coupons is had.

It is still another object of this invention to provide a record tablet suitable for investments or purchases wherein a ticket or coupon is given as evidence of the transaction, a plurality of tickets overlying a record sheet, whereby when entries are made upon the tickets, similar entries automatically appear upon the sheet and also in reverse writing upon the back of each ticket or coupon.

The invention also teaches the provision of a simple, accurate, and instantly reviewable record of transactions, evidenced in each instance by a ticket or coupon setting forth the character of the transaction as well as the amount expended.

While some of the more salient features, characteristics and advantages of the present invention have been above pointed out, others will become apparent from the following disclosures.

The invention includes these and other features of construction and combinations of parts, hereinafter described and shown in a preferred form in the drawing, as more particularly indicated by the claims.

On the drawing:

Figure 1 is a part fragmentary plan view of a pad or tablet embodying principles of the present invention, a portion of the figure being shown distorted to illustrate the operation of the invention.

Figure 2 is a plan view of the record sheet shown in Figure 1 after all tickets or coupons have been distributed, and all entries made.

Figure 3 is a side elevational view of the structure shown in Figure 1.

Figure 4 is a plan view of one of the tickets or coupons.

Figure 5 is a reduced somewhat diagrammatic view illustrating how several of the pads may be mounted upon one back board for the purpose of convenience.

As shown on the drawing:

In the illustrated embodiment of this invention there is shown an indicia and recording tablet, generally indicated by reference numeral 10, made up alternately of record sheet 11 and layers of overlapping tickets 12, as best seen in Figure 3. The different layers are preferably bound together along the margin 13 (Figure 1) in any suitable manner, such as by the well-known fabric and gum binding, whereby each ticket 12 and each record sheet is removable by tearing the same loose from this binder. Also, as best seen in Figure 1, a sheet of carbon paper 14 is easily disposed between a layer of tickets and a record sheet, this carbon preferably being double faced so as to reproduce an accurate copy of what is written upon each ticket, and at the same time reproduce, in reverse order, the same legend upon the rear side of the same ticket.

In Figures 1 and 3, it will be seen that the tickets 12 are arranged in overlapping relationship, the bottom ticket being applied first, so that the entire layer of tickets may be turned over, the same as a sheet, by grasping the bottom ticket. Conversely, the tickets may be restored to initial position by grasping the top ticket.

With reference to Figure 4, it will be seen that each ticket or coupon 12 is provided in a visible location with an identifying figure, in this instance a number 15. Also in a visible location, the ticket is provided with a suitable character, in this instance a capital letter "A", designated 16, to identify the particular clerk. Adjacent this letter, the name of the firm may appear together with instructions for use, such, for example, as "Please examine ticket immediately. No mistakes corrected after leaving window." In the upper portion thereof, the ticket is ruled to provide a space 17 of substantially the width of the exposed portion of each ticket. The exposed portion of each ticket is that portion lying immediately adjacent the carbon paper 14. General information pertaining to the character of the transaction may be entered in this space 17.

Immediately adjoining the space 17 the ticket is ruled to provide three spaces 18 for denoting the specific nature of the transaction. Adjacent these spaces another space 19 is provided, into which may be entered suitable information pertaining to the transaction. Just below the three spaces 18 suitable indicia 20, in this instance numerals "1", "2" and "3", are provided to identify each of the corresponding spaces 18.

The record sheet 11 is ruled similarly to the tickets with the exception that the identifying figure 15 of the ticket appears in the same row as the spaces 17, 18 and 19 of the ticket. In Figure 2 a complete record sheet is shown, and it will be seen that the identifying number 15a appears in the left hand portion of a row of spaces. Next, in successive order, appear the space 17a, the three spaces 18a and the final space 19a, corresponding respectively to the spaces 17, 18 and 19 on the exposed portion of the ticket. Immediately below this line of spaces, the record sheet is similarly ruled for the next adjacent ticket, each row of spaces upon the record sheet being of a size to accommodate the exposed portion of each successive ticket. Accordingly, it will be seen that one record sheet is sufficient to provide a complete record for a series of tickets, in this instance ten tickets numbered 121 to 130, inclusive, with a space at the bottom of the record sheet, normally covered by the lowermost ticket, for computing the various columns of figures.

For illustrative purposes, the operation of the present invention will be herein described in connection with security transfers or investments, although it will be readily understood that the invention is not so limited. For example, a record of small investments for securities is assumed. It is also assumed that the characters 20 appearing upon each ticket (numerals 1, 2 and 3 as illustrated) indicates three different kinds of securities, such, for example, as stocks, bonds and tax warrants.

An investor desires to purchase 7 bonds at the market price of $25.00 each. Clerk A on ticket No. 121 writes the numeral 7 in space 17 denoting the number of bonds, and then writes $175.00 in the second space 18 denoting the character of the securities purchased and the total amount expended by the purchaser. This writing by the clerk is at once reproduced in the corresponding spaces of the record sheet and, as indicated at 21 in Figure 1, is also reproduced in reverse order upon the back of the ticket itself, when a double surface carbon is used. After the entry relating to the transaction, ticket No. 121 is removed from the tablet 10 and given to the purchaser, but it will be seen that a complete record of the transaction is at once had upon a record sheet kept by the firm or establishment, and only one writing is necessitated, eliminating errors in copying the same entry onto other record sheets. Furthermore, the likelihood of successful falsifying of the entry upon the ticket by the purchaser is also eliminated.

Without having received the bonds so purchased, the investor may decide to sell the bonds, if the investment is of a somewhat speculative nature. Accordingly, the investor authorizes the sale, and subsequently returns ticket No. 121 and receives from the clerk the amount of the sale which is entered in space 19a upon the record sheet and may be entered in space 19 upon the returned ticket, if so desired.

In similar manner, each transaction may be evidenced by a ticket, the clerk entering the transaction upon each ticket and simultaneously upon the record sheet. Accordingly, after the series of tickets have been sold, the record sheet is complete in and of itself pertaining to the transactions evidenced by that series of tickets. Accordingly, the column for stock sales may be totaled, the column for bond sales may be totaled and the column for tax warrant sales may be totaled. Likewise, the column of returns to the investors may be totaled. The three columns of figures in spaces 18a may be added together to provide a total of money invested, and this amount may be subtracted from the money returned, or vice versa, to denote a profit or loss to the investors upon that particular sheet. If so desired, one series of tickets may be used only for one particular investor, and a firm or establishment is enabled at a glance to tell what investments have been most beneficial to that investor and whether or not that investor is making or losing money.

Furthermore, at any time so desired, a supervisor may glance at the tablet 10 before any clerk and notice at once if any ticket has been removed out of its sequential order. He may also throw over the layer of tickets and examine the record sheet therebeneath to see that no entries have been made prior to the actual removal of a ticket. In this manner, the likelihood of falsifying of the records on the part of the clerk is eliminated.

In Figure 5, I have shown diagrammatically an arrangement whereby a plurality of tablets 10 each comprising a plurality of record sheets and a plurality of layers of tickets in alternate relationship, may be mounted upon a single back board 22. With this arrangement, a clerk can use a layer of tickets from each of the tablets on the work done during a particular day, and thus, at the busiest hours, the clerk does not need to take the time to remove and replace the carbon paper. Such rearrangement of carbon paper can be done outside of business hours when more time is available.

While the present invention has been illustrated and described herein as adaptable for use in connection with investment transactions pertaining to securities, it will be understood that by obvious variations in the printed matter, the invention is equally adaptable for use in restaurants, check rooms, repair shops, loan shops, and, in fact, any establishment wherein a ticket or coupon is given in exchange for an article left upon deposit or evidencing an expenditure, and since the pad is long, stiff, and relatively narrow, as shown in Figures 1 and 3, it is particularly adapted to be placed on the palm of the hand while being marked.

For example, if the invention is to be used in a check room, the spaces 18 upon the ticket may be used to identify respectively hats, coats and bags. The space 17 may be used to indicate the number checked upon one ticket and the space 19 the amount received for the checking service.

If the invention is to be used in a repair shop, the space 17 may indicate the number of items, the spaces 18, the particular character of service, and the space 19, the amount received for the service.

In any instance where the present invention is used, it will be seen that a complete record adaptable for filing in a record book or other suitable location, of all transactions upon one day or for a certain series of tickets is provided. It is also apparent that the likelihood of errors or falsifying of records or entries upon tickets is eliminated, and a great amount of labor heretofore necessitated is also eliminated. Furthermore, the pad or tablet 10 may be made in any desirable shape or form, with or without perforations, and of any desirable and suitable material. Consequently, the present invention is very economical in its original cost, to say nothing of the saving in labor provided by it.

While the term "ticket" has been used herein to a great extent, it will be understood that the various items 12 may be in the form of tickets, coupons, checks, receipts, or any items of a similar nature.

It will be obvious that after the ticket has been suitably marked by the clerk, it may be slid by a finger of the left hand over the underlying ticket, towards the right, to bow the ticket and present a loop therein in which the thumb of the hand holding the marking pencil, or the pencil, may be inserted to quickly tear the ticket from the pad. The construction shown, therefore, obviously makes for speed when a large crowd is to be served.

I am aware that many changes may be made and numerous details of construction may be varied through a wide range without departing from the principles of this invention and I, therefore, do not purpose limiting the patent granted hereon otherwise than necessitated by the prior art.

I claim is my invention:

1. A tablet for recording investments, said tablet comprising an elongated and relatively narrow stiff back, a record sheet overlying said back and bound to it along only one margin thereof, a row of separable tickets in overlapped relation to each other positioned overlying said record sheet and bound to said back along only one margin thereof, said record sheet carrying a row of identifying numerals along its length, said numerals being normally covered by tickets having similar identifying numerals, the numerals on said ticket being positioned so that each ticket substantially covers the numerals on an underlying ticket and whereby the covered numeral is fully exposed when an immediately overlying ticket is removed.

2. In a device of the character described, a tablet comprising a back, and a plurality of record sheets alternating with rows of overlapping tickets and all bound to said back only along the right hand edge thereof, said tickets being so disposed relative to each other that an upper part of each ticket overlies a cooperable part of a record sheet, said tickets having their left-hand margins free and being positioned so that the left-hand margin of a ticket may be held by a person writing upon the ticket and then this margin may be pushed towards the bound edge to bow the ticket upwardly and provide means whereby the ticket may be readily grasped and easily separated along the bound edge of the table by the thumb of the writing hand of the user of the tablet.

3. A tablet for recording investments, said tablet comprising an elongated stiff back, a record sheet overlying said back and bound to it along only one margin, a row of separable tickets in overlapped relation to each other positioned overlying said record sheet and bound to said back along only one margin thereof, a majority of said tickets being provided with identifying means on that portion of their face which normally underlies an overlapping ticket and being exposed when the overlapping ticket is separated from the tablet.

JAMES J. O'BRIEN.